(12) United States Patent
Miyaki et al.

(10) Patent No.: US 9,925,794 B2
(45) Date of Patent: Mar. 27, 2018

(54) PRINT DATA GENERATION APPARATUS PERFORMING COLOR REPLACEMENT ON IMAGE DATA

(71) Applicant: BROTHER KOGYO KABUSHIKI KAISHA, Nagoya, Aichi (JP)

(72) Inventors: Kazuyuki Miyaki, Ichinomiya (JP); Takuya Shimahashi, Nagoya (JP); Shota Morikawa, Nagoya (JP); Akidi Yoshida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/474,393

(22) Filed: Mar. 30, 2017

(65) Prior Publication Data

US 2017/0282589 A1   Oct. 5, 2017

(30) Foreign Application Priority Data

Mar. 30, 2016  (JP) ................................. 2016-068739

(51) Int. Cl.
*B41J 2/21*   (2006.01)
*H04N 1/60*   (2006.01)

(52) U.S. Cl.
CPC .......... *B41J 2/2103* (2013.01); *H04N 1/6008* (2013.01)

(58) Field of Classification Search
CPC ... B41J 2/2103; B41J 2/175; B41J 2/21; B41J 2/17566; H04N 1/60; H04N 1/6008; H04N 1/23; H04N 1/6022
See application file for complete search history.

(56) References Cited

U.S. PATENT DOCUMENTS 6,343,194 B1   1/2002  Shimada
2004/0021713 A1*  2/2004  Mizoguchi ........... B41J 2/17566
                                                                347/7

FOREIGN PATENT DOCUMENTS

| JP | 08108548 | * | 4/1996 | ....................... 2/175 |
| JP | H08-118673 A |  | 5/1996 |  |
| JP | 2001-018456 A |  | 1/2001 |  |
| JP | 2006-301328 A |  | 11/2006 |  |
| JP | 2007-160657 A |  | 6/2007 |  |

(Continued)

*Primary Examiner* — Kristal Feggins
(74) *Attorney, Agent, or Firm* — Scully, Scott, Murphy & Presser, PC

(57) ABSTRACT

In a print data generation apparatus, a print data generation apparatus generates print data. The print data includes post-replacement data obtained by the color replacement on pre-replacement data. The post-replacement data includes a plurality of post-replacement pixel values. Each post-replacement pixel value includes a plurality of post-replacement color components. In a case where a first residual amount of a first colorant is smaller than a second residual amount of a second colorant and a first consumption amount concerning the first colorant is larger than a second consumption amount concerning the second colorant, the color replacement on the pre-replacement data is performed so that a second post-replacement component corresponding to the second colorant is set to a first pre-replacement component value corresponding to the first colorant and the first post-replacement component corresponding to the first colorant is set to a pre-replacement component value other than the first pre-replacement component value.

13 Claims, 6 Drawing Sheets

(56) References Cited

FOREIGN PATENT DOCUMENTS

| JP | 2007292871 | * | 11/2007 | ........................ 2/175 |
| JP | 4475625 | * | 6/2010 | ............... H04N 1/60 |

* cited by examiner

PRINT DATA GENERATION APPARATUS PERFORMING COLOR REPLACEMENT ON IMAGE DATA

CROSS REFERENCE TO RELATED APPLICATION

This application claims priority from Japanese Patent Application No. 2016-068739 filed Mar. 30, 2016. The entire content of the priority application is incorporated herein by reference.

TECHNICAL FIELD

The present disclosure relates to technology that generates print data for a printer using a plurality of types of colorant.

BACKGROUND

Japanese Patent Application Publication No. 2006-301328 discloses an image forming apparatus provided with toners of C (cyan), M (magenta), Y (yellow), and K (black) and configured to replace colors depending on consumption amounts of toners and residual amounts of toners. In the replacement of colors, the image forming apparatus determines a descending order of colors with respect to the respective residual amount of the toner. For example, when the toner residual amount descends in the order of C, Y, and M, the following color numbers are assigned with colors for designating the ascending order: C=color number 1, M=color number 3, and Y=color number 2. Next, the image forming apparatus determines a descending order of colors with respect to the ratio of respective consumption amounts of toners. For example, when the ratio of the consumption amount of C, M, Y, and K toner is CMYK (128, 50, 20, 0), the following numbers regarding ratio are assigned with colors for designating the descending order with respect to the ratio:number regarding ratio 1=C (128), number regarding ratio 2=M (50), and number regarding ratio 3=Y (20). The image forming apparatus replaces so that the color number matches the number regarding ratio for each color. That is, CMYK (128, 50, 20, 0) is replaced with CMYK (128, 20, 50, 0) in which the values of M and Y are mutually interchanged.

SUMMARY

In the above technology, there may be a possibility that both the two values CMYK (128, 50, 20, 0) and CMYK (20, 128, 50, 0), which are mutually different in the ratio of consumption amounts of toners, are replaced with the same CMYK (128, 20, 50, 0) when the residual amounts of toners descend in the order of C, Y, and M. The present disclosure provides a technique to replace the colors depending on the estimated consumption amount and the residual amount of the colorants while avoiding the aforementioned situation.

In order to attain the above and other objects, the disclosure provides a print data generation apparatus. The print data generation apparatus includes a processor and a memory. The memory stores computer-readable instructions therein. The computer-readable instructions, when executed by the processor, causes the print data generation apparatus to perform: acquiring target image data representing a target image which is a target for a printing operation in which a printer uses a plurality of types of colorant representing respectively a plurality of colors having a first color and a second color, the plurality of types of colorant having a first colorant representing the first color and a second colorant representing the second color, the target image including a plurality of pixels and including a first image including an allowable image which is a target for color replacement, the allowable image having a first-color region and a second-color region, consumption amounts of at least one type of colorant in the first-color region being different from consumption amounts of at least one type of colorant in the second-color region; acquiring first information concerning a plurality of residual amounts respectively corresponding to the plurality of types of colorant, the plurality of residual amounts including a first residual amount of the first colorant and a second residual amount of the second colorant; acquiring second information concerning a first consumption amount and a second consumption amount, the first consumption amount being an estimated amount of the first colorant to be consumed in a case where the entire first image is printed by the printer on a basis of pre-replacement data obtained from the target image data without performing color replacement, the second consumption amount being an estimated amount of the second colorant to be consumed in the case where the entire first image is printed by the printer on the basis of the pre-replacement data without performing the color replacement, the pre-replacement data representing the first image, the pre-replacement data including a plurality of pre-replacement pixel values respectively corresponding to pixels in the first image, each pre-replacement pixel value including a plurality of pre-replacement components respectively corresponding to the plurality of types of colorant, the plurality of pre-replacement components being respectively set to a plurality of pre-replacement component values, the plurality of pre-replacement component value including a first pre-replacement component value corresponding to the first colorant and a second pre-replacement component value corresponding to the second colorant; and generating print data representing the entire target image by using the target image data, the print data being for the printer to print the target image with the plurality of types of colorant, the print data including post-replacement data representing the first image, the post-replacement data being obtained by the color replacement on the pre-replacement data, the post-replacement data including a plurality of post-replacement pixel values respectively corresponding to the pixels in the first image, each post-replacement pixel value including a plurality of post-replacement color components respectively corresponding to the plurality of types of colorant, the plurality of post-replacement components including a first post-replacement component corresponding to the first colorant and a second post-replacement component corresponding to the second colorant. In a case where the first residual amount is smaller than the second residual amount and the first consumption amount is larger than the second consumption amount, the color replacement on the pre-replacement data is performed so that in the allowable image, the second post-replacement component of a pixel is set to the first pre-replacement component value of the pixel and the first post-replacement component of the pixel is set to a pre-replacement component value other than the first pre-replacement component value of the pixel.

According to another aspects, the disclosure provides a non-transitory computer readable storage medium storing a set of program instructions installed on and executed by a computer. The set of program instructions includes: acquiring target image data representing a target image which is a target for a printing operation in which a printer uses a plurality of types of colorant representing respectively a plurality of colors having a first color and a second color, the plurality of types of colorant having a first colorant representing the first color and a second colorant representing the second color, the target image including a plurality of pixels and including a first image including an allowable image which is a target for color replacement, the allowable image having a first-color region and a second-color region, consumption amounts of at least one type of colorant in the first-color region being different from consumption amounts of at least one type of colorant in the second-color region; acquiring first information concerning a plurality of residual amounts respectively corresponding to the plurality of types of colorant, the plurality of residual amounts including a first residual amount of the first colorant and a second residual amount of the second colorant; acquiring second information concerning a first consumption amount and a second consumption amount, the first consumption amount being an estimated amount of the first colorant to be consumed in a case where the entire first image is printed by the printer on a basis of pre-replacement data obtained from the target image data without performing color replacement, the second consumption amount being an estimated amount of the second colorant to be consumed in the case where the entire first image is printed by the printer on the basis of the pre-replacement data without performing the color replacement, the pre-replacement data representing the first image, the pre-replacement data including a plurality of pre-replacement pixel values respectively corresponding to pixels in the first image, each pre-replacement pixel value including a plurality of pre-replacement components respectively corresponding to the plurality of types of colorant, the plurality of pre-replacement components being respectively set to a plurality of pre-replacement component values, the plurality of pre-replacement component value including a first pre-replacement component value corresponding to the first colorant and a second pre-replacement component value corresponding to the second colorant; and generating print data representing the entire target image by using the target image data, the print data being for the printer to print the target image with the plurality of types of colorant, the print data including post-replacement data representing the first image, the post-replacement data being obtained by the color replacement on the pre-replacement data, the post-replacement data including a plurality of post-replacement pixel values respectively corresponding to the pixels in the first image, each post-replacement pixel value including a plurality of post-replacement color components respectively corresponding to the plurality of types of colorant, the plurality of post-replacement components including a first post-replacement component corresponding to the first colorant and a second post-replacement component corresponding to the second colorant. In a case where the first residual amount is smaller than the second residual amount and the first consumption amount is larger than the second consumption amount, the color replacement on the pre-replacement data is performed so that in the allowable image, the second post-replacement component of a pixel is set to the first pre-replacement component value of the pixel and the first post-replacement component of the pixel is set to a pre-replacement component value other than the first pre-replacement component value of the pixel.

According to another aspects, the disclosure provides a print data generation apparatus. The print data generation apparatus includes: first acquiring means for acquiring target image data representing a target image which is a target for a printing operation in which a printer uses a plurality of types of colorant representing respectively a plurality of colors having a first color and a second color, the plurality of types of colorant having a first colorant representing the first color and a second colorant representing the second color, the target image including a plurality of pixels and including a first image including an allowable image which is a target for color replacement, the allowable image having a first-color region and a second-color region, consumption amounts of at least one type of colorant in the first-color region being different from consumption amounts of at least one type of colorant in the second-color region; second acquiring means for acquiring first information concerning a plurality of residual amounts respectively corresponding to the plurality of types of colorant, the plurality of residual amounts including a first residual amount of the first colorant and a second residual amount of the second colorant; third acquiring means for acquiring second information concerning a first consumption amount and a second consumption amount, the first consumption amount being an estimated amount of the first colorant to be consumed in a case where the entire first image is printed by the printer on a basis of pre-replacement data obtained from the target image data without performing color replacement, the second consumption amount being an estimated amount of the second colorant to be consumed in the case where the entire first image is printed by the printer on the basis of the pre-replacement data without performing the color replacement, the pre-replacement data representing the first image, the pre-replacement data including a plurality of pre-replacement pixel values respectively corresponding to pixels in the first image, each pre-replacement pixel value including a plurality of pre-replacement components respectively corresponding to the plurality of types of colorant, the plurality of pre-replacement components being respectively set to a plurality of pre-replacement component values, the plurality of pre-replacement component value including a first pre-replacement component value corresponding to the first colorant and a second pre-replacement component value corresponding to the second colorant; and generating means for generating print data representing the entire target image by using the target image data, the print data being for the printer to print the target image with the plurality of types of colorant, the print data including post-replacement data representing the first image, the post-replacement data being obtained by the color replacement on the pre-replacement data, the post-replacement data including a plurality of post-replacement pixel values respectively corresponding to the pixels in the first image, each post-replacement pixel value including a plurality of post-replacement color components respectively corresponding to the plurality of types of colorant, the plurality of post-replacement components including a first post-replacement component corresponding to the first colorant and a second post-replacement component corresponding to the second colorant. In a case where the first residual amount is smaller than the second residual amount and the first consumption amount is larger than the second consumption amount, the color replacement on the pre-replacement data is performed so that in the allowable image, the second post-replacement component of a pixel is set to the first pre-replacement component value of the pixel and the first post-replacement component of the pixel is set to a pre-replacement component value other than the first pre-replacement component value of the pixel.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
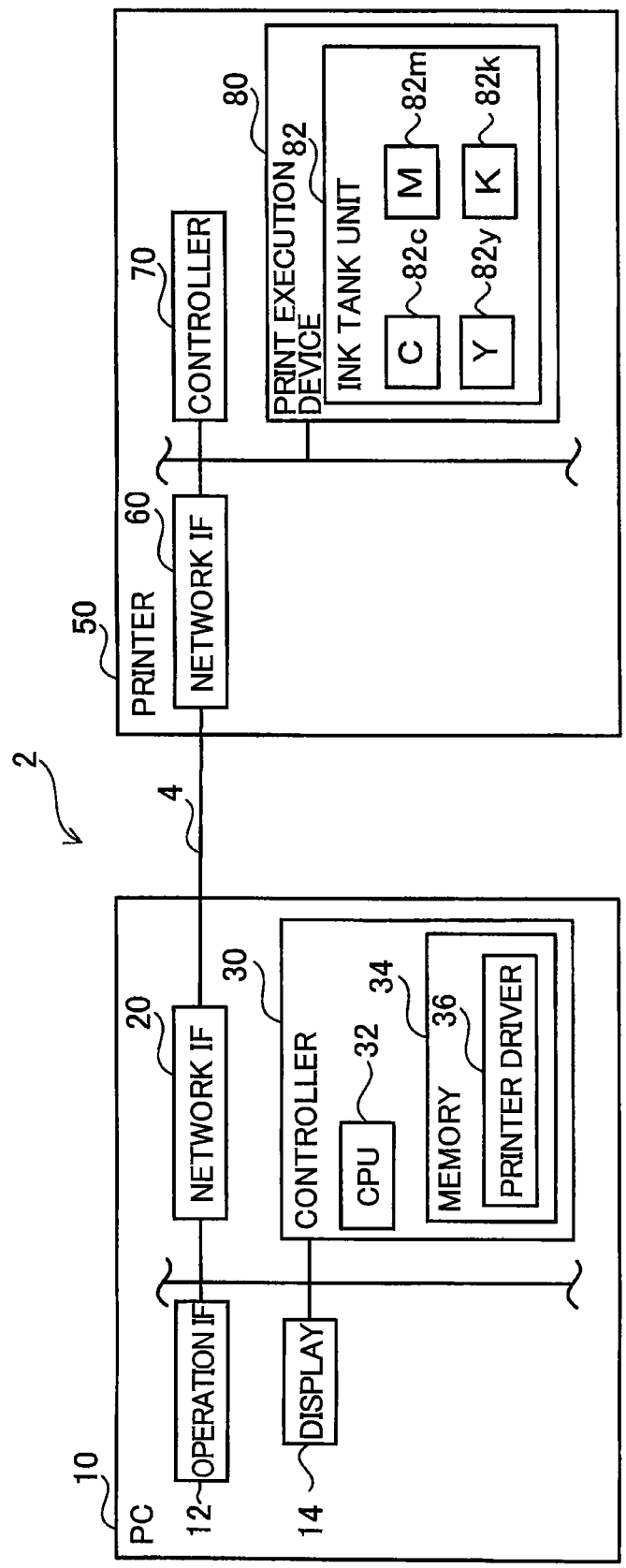
FIG. 1 is a clock diagram illustrating a configuration of a print system according to a first embodiment.

First Embodiment (Configuration of Print System 2, FIG. 1)

As illustrated in FIG. 1, a print system 2 includes a PC 10 and a printer 50. The PC 10 and the printer 50 can communicate with each other via a LAN 4.

(Configuration of PC 10, FIG. 1)

The PC 10 includes an operation interface 12, a display 14, a network interface 20, and a controller 30. Hereinafter, the interface is referred to as "IF". The network IF 20 is connected to the LAN 4 (wired or wireless). The operation IF 12 includes a mouse and a keyboard. A user can input various instructions to the PC 10 by operating the operation IF 12. The display 14 is a display for displaying various screens.

The controller 30 includes a CPU 32 and a memory 34. The CPU 32 executes various processes according to an OS program (not shown) and a printer driver 36 stored in the memory 34. The printer driver 36 is a program for generating print data representing a print image by using print target data and supplying the print data to the printer 50. The printer driver 36 may be installed to the PC 10 through a non-transitory computer-readable storage medium shipped together with the printer 50, or through an Internet server. The memory 34 is a storage medium including a ROM and a RAM.

(Configuration of Printer 50; FIG. 1)

The printer 50 is an inkjet printer. The printer 50 includes a network IF 60, a controller 70, and a print execution device 80. The network IF 60 is connected to the LAN 4. As a result, the PC 10 and the printer 50 are communicably connected to each other. The controller 70 includes a CPU (not shown) and a memory (not shown), and executes various processes so as to allow the print execution device 80 to execute print operation. The print execution device 80 includes an ink tank unit 82 and a print head (not shown) and a head drive section.

The ink tank unit 82 has four ink tanks 82c, 82m, 82y, and 82k respectively corresponding to four color inks of C (cyan), M (magenta), Y (yellow), and K (black). The ink is an example of colorant. The ink tank unit 82 has sensors (not shown) that detect residual amounts of inks in the respective ink tanks 82c, 82m, 82y, and 82k. The ink head has a plurality of nozzles connected to the four color ink tanks 82c, 82m, 82y, and 82k. The controller 70 controls the print head according to print data to form large, medium, or small dots on a print medium (a recording sheet). The print head (not shown) is driven by the head drive section (not shown).

The user of the PC 10 can specify target data to be printed by the printer 50 by operating the operation interface 12. For example, the user connects the PC 10 to the Internet to download target data on the Internet onto the PC 10. Alternatively, the user can make the PC 10 read target data stored in a recording medium that the PC 10 can read. Further, the user inputs a prescribed instruction operation via the operation interface 12 to designate target data so that the printer 50 performs the printing operation on the target data together with the PC 10. The print instruction operation includes an operation for starting up the printer driver 36.

Figure 2:
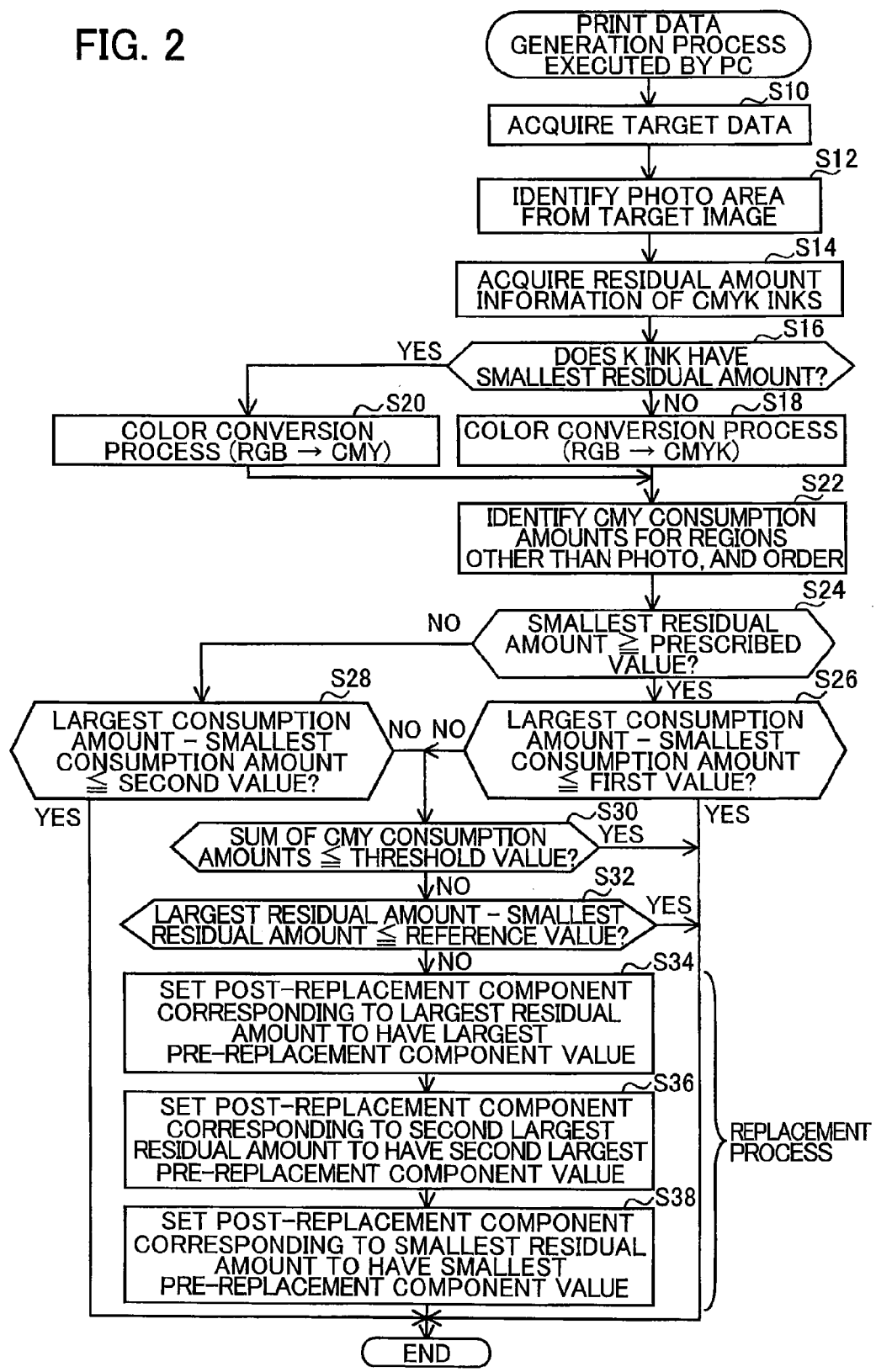
FIG. 2 is a flowchart illustrating a print data generation process according to the first embodiment.

(Print Data Generation Process, FIG. 2)

With reference to FIG. 2, the content of print data generation process that the CPU 32 executes according to the printer driver 36 will be described. The print data generation process is a process for generating print data interpretable by the printer 50 by using target data. The print data generation process is started when the user executes the print instruction operation.

In S10, the CPU 32 acquires the target data specified by the user. For example, when the user executes a print instruction operation (e.g., operation of clicking a print button on a web browser) for printing target data located on the Internet, the CPU 32 stores the target data in a prescribed area of the memory 34. Alternatively, the user executes another print instruction operation (e.g., operation of clicking a print button in a state where a target image TA (FIG. 3) represented by target data is displayed on the display 14) for printing the target data stored in a recording medium which is readable by the PC 10, the CPU 32 stores the target data in the prescribed area of the memory 34, for example. The target data is image data (e.g., data in a PDF format) represented by three colors of pixel values (RGB values).

Figure 3:
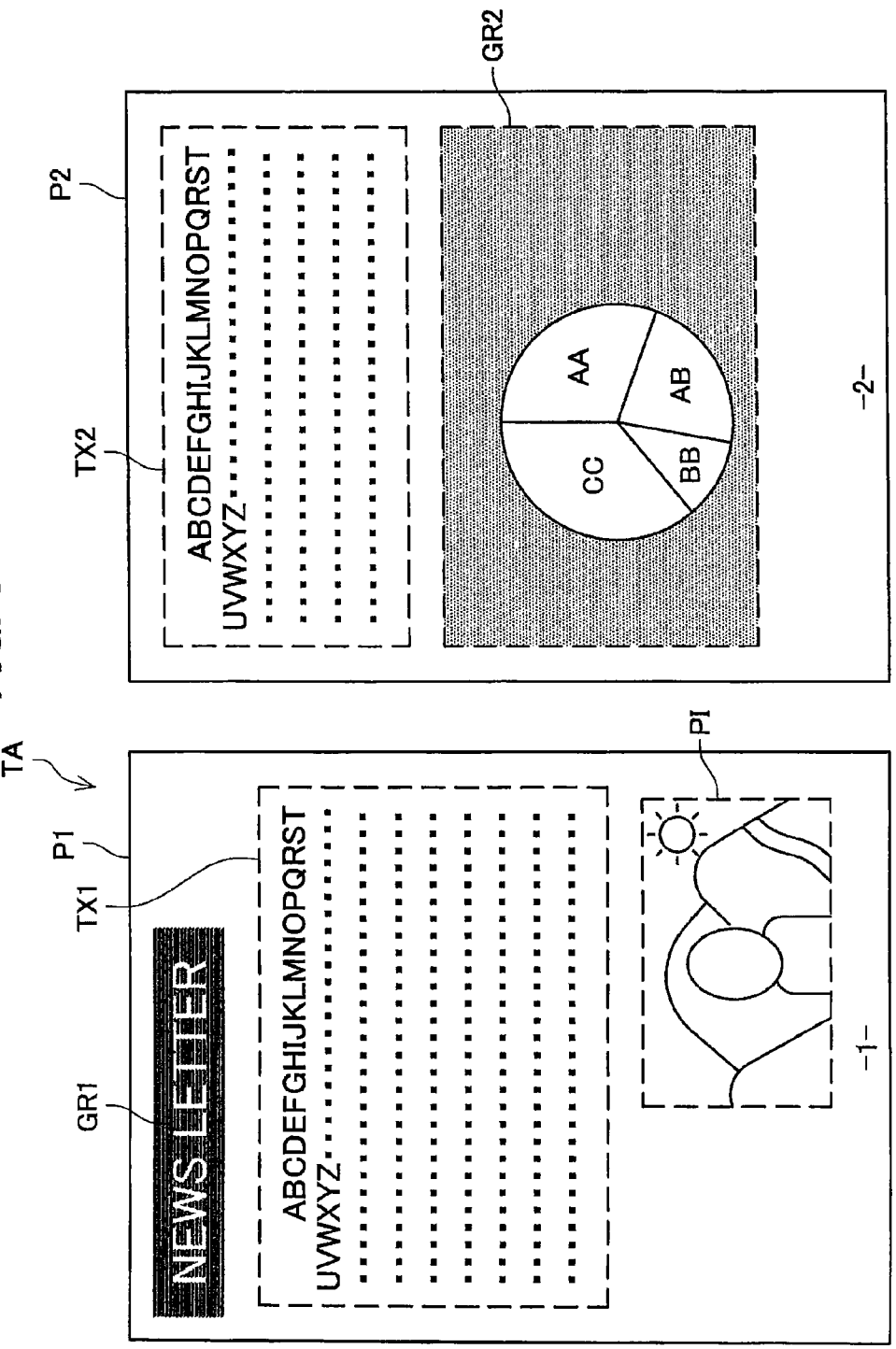
FIG. 3 is an explanatory diagram illustrating a target image.

As shown in FIG. 3, a target image TA represented by the target data represents a document having two pages. The target image TA includes page images P1 and P2 representing two respective pages. The page image P1 is a first page, and includes a graphic area GR1, a text area TX1, and a photo area PI on a white background. The page image P2 is the second page, and includes a graphic area GR2 and a text area TX2 on a white background. Each of the text areas TX1 and TX2 is an area where black or chromatic characters are arranged on the white background. The photo area PI is an area where a color photo is arranged. Each of the graphic areas GR1 and GR2 is an area including objects depicted by an author of the target data, such as a graph, a figure, characters on a background having a color other than white, and deformed characters. Each of the graphic areas GR1 and GR2 is included in neither the text area nor photo area. In the graphic area GR1, white characters are depicted on a red background. In the graphic area GR2, a circle graph having a plurality of colors is depicted on a yellow background. Consumption amounts of C, M, Y, and K inks differ among the areas TX1, TX2, GR1, and GR2. Consumption amounts of C, M, Y, and K inks differ between the black color characters and chromatic color characters in each of the text areas TX1 and TX2. Similarly, consumption amounts of C, M, Y, and K inks differ between the yellow background and the plurality of colors in the graphic area GR2. Areas among the areas TX1, TX2, GR1, and GR2 where the consumption amounts of at least one of C, M, Y, and K inks are different from each other is an example of "color area". Or, areas in one of the areas TX1, TX2, GR1, and GR2 where the consumption amounts of at least one of C, M, Y, and K inks are different from each other is an example of "color area".

In S12, the CPU 32 identifies the photo area PI from the target image TA. Specifically, the CPU 32 first divides the target image TA into a plurality of blocks. Here, each of the blocks has 8×8 pixels. The CPU 32 identifies a brightness distribution of each block. As a result, the CPU 32 identifies a combination of a brightness distribution of a block and position information indicating a position of the block for each of the plurality of blocks in the entire target image TA. Subsequently, the CPU 32 classifies the plurality of blocks into two block groups: a block group including only a white background; and a specific block group including an object other than the white background. Then, the CPU 32 identifies all continuous blocks classified into the specific block group as one area by using the position information combined with each of the blocks classified into the specific block group. As a result, five areas corresponding to the graphic areas GR1 and GR2, the text areas TX1 and TX2, and the photo area PI are identified. Each of the five identified areas includes the position information of all blocks included in the area and brightness information thereof. At this stage, identification of type of area is yet to be made for each identified block. Here, the type of area is the graphic area, text area, or photo area.

Further, the CPU 32 makes identification of the type of area for each of the five identified blocks. That is, the CPU 32 determines each area as one of the graphic area, text area, or photo area. Specifically, an area is identified as the text area when the brightness distribution of each block included in the area is unevenly distributed in high and low brightness values. An area is identified as the photo area when the brightness distribution of each block included in the area is evenly distributed from the low brightness value to the high brightness value. Further, an area is identified as the graphic area when the area is determined to be neither the text nor photo areas based on the brightness distributions of the blocks included in the area. Alternatively, the CPU 32 may identify only the photo area from the identified five areas. The CPU 32 may use a known arbitrary method other than the above method so as to identify the respective areas.

Subsequently, in S14, the CPU 32 acquires, from the printer 50, residual amount information indicating residual amounts of CMYK inks in the respective ink tanks 82c, 82m, 82y, and 82k. Specifically, the CPU 32 transmits a request for the residual amount information to the printer 50 via the LAN 4. The controller 70 of the printer 50 receives the request for the residual amount information and uses the sensors of the ink tank unit 82 to acquire the residual amounts in the respective ink tanks 82c, 82m, 82y, and 82k. The controller 70 transmits the residual amount information indicating the acquired residual amounts to the PC 10. The residual amount information includes a combination of each indication of CMYK colors ("C", "M", "Y", and "K") and the corresponding residual amount of ink (ml) for each of CMYK (for example, C=5 ml, M=15 ml, Y=12 ml, K=10 ml).

In S16, the CPU 32 determines whether the residual amount of K ink is the smallest by using the residual amount information acquired in S14. When the residual amount of K ink is not the smallest (S16: NO), in S18 the CPU 32 executes a color conversion process by using the target data TA. In the color conversion process, the target image TA is converted from an image represented by an RGB color space into an image represented by a CMYK color space. Subsequently, in the color conversion process, as illustrated in four pixels on the left side of FIG. 4, a pixel value concerning dot formation of CMYK are identified for each pixel in the target data TA. In the upper-left pixel of FIG. 4, the upper side (P, Q) indicates the coordinates of the pixel, and the lower side (C, M, Y, K)=(3, 2, 1, 0) indicates a pixel value. Specifically, the pixel value (C, M, Y, K) indicates the color coordinates of the CMYK color space for one pixel. The pixel value (C, M, Y, K) include four pre-replacement components respectively corresponding to C, M, Y, and K colors. Each pre-replacement component has a pre-replacement component value indicating a density (or dot formation state) of the corresponding color. The pre-replacement component value=3, the pre-replacement component value=2, the pre-replacement component value=1 indicate a large dot, a medium dot, and a small dot, respectively. The pre-replacement component value=0 indicates that dot is not formed. For example, in the pixel at the coordinates (P, Q), a large dot is formed by the C ink, a medium dot is formed by M ink, a small dot is formed by Y ink, and no dot is formed by K ink. After completion of the color conversion process, the CPU 32 advances to S22.

On the other hand, when the residual amount of K ink is the smallest (S16: YES), in S20 the CPU 32 executes a color conversion process by using the target data TA. In the color conversion process of S20, the areas GR1, GR2, TX1, and TX2 identified in S12, which are other than the photo area PI, are converted from images represented by the RGB space into images represented by CMY space. More in detail, in the color conversion process of S20, the value K, which is one of component values represented in the CMYK color space, is converted to (thus, represented by) the CMY color space. That is, the pre-replacement component of K does not have a value. Further, in S20, the photo area PI is converted from an image represented by the RGB color space into an image represented by the CMYK color space. Subsequently, in this color conversion process, as illustrated in four pixels on the left side of FIG. 5, pre-replacement component values concerning dot formation of CMY colors are identified for each pixel in each of the areas (GR1, GR2, TX1, and TX2) other than the photo area PI. Further, pre-replacement component values concerning dot formation of CMYK colors are identified for each pixel in the photo area PI. After completion of the color conversion process, pre-replacement data before execution of replacement processes S32-S36 is generated. After generation of the pre-replacement data, the CPU 32 advances to S22.

In S22, the CPU 32 estimates consumption amounts of respective C, M, and Y inks and the order thereof in the areas (GR1, GR2, TX1, and TX2) other than the photo area PI identified in S12, by using the converted data (that is, pre-replacement data) obtained by the color conversion process. Specifically, the CPU 32 calculates, for each of C, M, Y colors, the sum of pre-replacement component values in all of the areas (GR1, GR2, TX1, and TX2) other than the photo area PI. That is, for each color, the sum of pre-replacement component values in the areas other than the photo area PI indicates a consumption amount. The CPU 32 determines the descending order of the estimated consumption amounts of C, M, and Y colors. For example, as illustrated in Tables 1 and 2, the CPU 32 determines that the estimated consumption amounts of C and Y is the largest and smallest, respectively. In this case, the descending order of the estimated consumption amounts of C, M, and Y colors is so that the color C is the first (the number "1" in Table 1), the color M is the second (the number "2" in Table 2), and the color Y is the last (the number "3" in Table 1). Here, Table 1 illustrates a case where the residual amount of K ink is not the smallest, and Table 2 illustrates a case where the residual amount of K ink is the smallest.

TABLE 1

|  | C | M | Y | K |
|---|---|---|---|---|
| Residual amount (ml) | 5 | 15 | 12 | 10 |
| Estimated consumption amount (order) | 1 | 2 | 3 | — |

TABLE 2

|  | C | M | Y | K |
|---|---|---|---|---|
| Residual amount (ml) | 5 | 15 | 12 | 3 |
| Estimated consumption amount (order) | 1 | 2 | 3 | — |

In S24, the CPU 32 determines whether the smallest residual amount (C in Table 1, and K in Table 2) among those of C, M, Y, and K colors is greater than or equal to a first prescribed value (e.g., 5 ml). When the smallest residual amount is greater than or equal to the first prescribed value (S24: YES), in S26 the CPU 32 determines whether the difference between the largest consumption amount (C in Tables 1 and 2) and the smallest consumption amount (Y in Tables 1 and 2) is smaller than or equal to a first value (e.g., 1000) among those of C, M, and Y colors. When the difference between the largest consumption amount and the smallest consumption amount is smaller than or equal to the first value (S26: YES), the CPU 32 ends the print data generation process without executing the replacement process (S34-S38). As a result, the converted data including the pre-replacement data generated in S18 or S20 is generated as print data. When the difference between the largest consumption amount and the smallest consumption amount is greater than the first value (S26: NO), the CPU 32 advances to S30.

On the other hand, when the smallest residual amount is less than the first prescribed value (S24: NO), in S28 the CPU 32 determines whether the difference between the largest consumption amount (C in Tables 1 and 2) and the smallest consumption amount (Y in Tables 1 and 2) among those of C, M, and Y colors is smaller than or equal to a second value (e.g., 500). The second value is smaller than the first value. When the difference between the largest consumption amount and the smallest consumption amount is smaller than or equal to the second value (S28: YES), the CPU 32 ends the print data generation process without executing the replacement process S34-S38. As a result, the converted data including the pre-replacement data generated in S18 or S20 is generated as the print data. When the difference between the largest consumption amount and the smallest consumption amount is greater than the second value (S28: NO), the CPU 32 advances to S30.

In S30, the CPU 32 determines whether the total sum of the consumption amounts of C, M, and Y inks estimated in S22 is smaller than or equal to a first threshold value. When the total sum of the consumption amounts of C, M, and Y inks is smaller than or equal to the first threshold value (S30: YES), the CPU 32 ends the print data generation process without executing the replacement process S34-S38. As a result, the converted data including the pre-replacement data generated in S18 or S20 is generated as the print data. When the total sum of the consumption amounts of C, M, and Y inks is greater than the first threshold value (S30: NO), in S32 the CPU 32 determines whether the difference between the largest residual amount and the smallest residual amount among those of C, M, Y, and K is smaller than or equal to a reference value. When the difference between the largest residual amount and the smallest residual amount is smaller than or equal to the reference value (S33: YES), the CPU 32 ends the print data generation process without executing the replacement process S34-S38. As a result, the converted data including the pre-replacement data generated in S18 or S20 is generated as the print data.

On the other hand, when the largest residual amount and the smallest residual amount is greater than the reference value (S32: NO), the CPU 32 executes the color replacement process S34-S38 for generating post-replacement data. The post-replacement data is generated by converting the pre-replacement data. The post-replacement data includes CMYK coordinates for each pixel in areas other than the photo area PI. That is, the pixel value (C, M, Y, K) include four post-replacement components respectively corresponding to C, M, Y, and K colors. Each post-replacement component has a post-replacement component value indicating a density (or dot formation state) of the corresponding color. Note, the post-replacement component of K has the pre-replacement component value of K. The post-replacement component value of each component of C, M, and Y colors is determined as follows.

That is, in S34 the CPU 32 sets a post-replacement value of a color corresponding to the largest residual amount among C, M, and Y colors so as to have a pre-replacement component value of a color corresponding to the largest consumption amount among C, M, and Y colors, in each pixel of areas other than the photo area PI.

In S36, the CPU 32 sets a component in the post-replacement value of a color corresponding to the second largest residual amount among C, M, and Y colors so as to have a pre-replacement component value of a color corresponding to the second largest consumption amount among C, M, and Y colors, in each pixel of areas other than the photo area PI.

In S38, the CPU 32 sets a post-replacement component of a color corresponding to the smallest residual amount among C, M, and Y colors so as to have a pre-replacement component value of a color corresponding to the smallest consumption amount among C, M, and Y colors, in each pixel of areas other than the photo area PI. Subsequently, the entire print data is generated so that the whole print data includes post-replacement data in which post-replacement components have replaced pre-replacement component values generated in S18 or S20 for each pixels in the areas other than the photo area, and partial print data representing the photo area PI on which the replacement process is not performed. That is, the partial print data representing the photo area PI is the pre-replacement data in the photo area PI. As described above, the replacement process is performed so that a first color order matches a second color order. Here, the first color order is an order of the colors corresponding to an ascending order of a plurality of consumption amounts to be consumed when the entire allowable image is printed on the basis of the values of the plurality of post-replacement components, and the second color order is an order of the colors corresponding to an ascending order of the plurality of residual amounts.

After generation of the print data, the CPU 32 transmits the generated print data to the printer 50. The printer 50 executes a printing operation using the received print data.

Note that when the color conversion is performed in S20, the pixel value is represented in the CMY color space, and thus the pre-replacement component value of K does not have a value. Thus, the post-replacement component value of K does not have a value, and the post-replacement component values of CMY represents black corresponding to the pre-replacement component value of K which is obtained if the color conversion is performed from the RGB color space to the CMYK color space.

Figure 4:
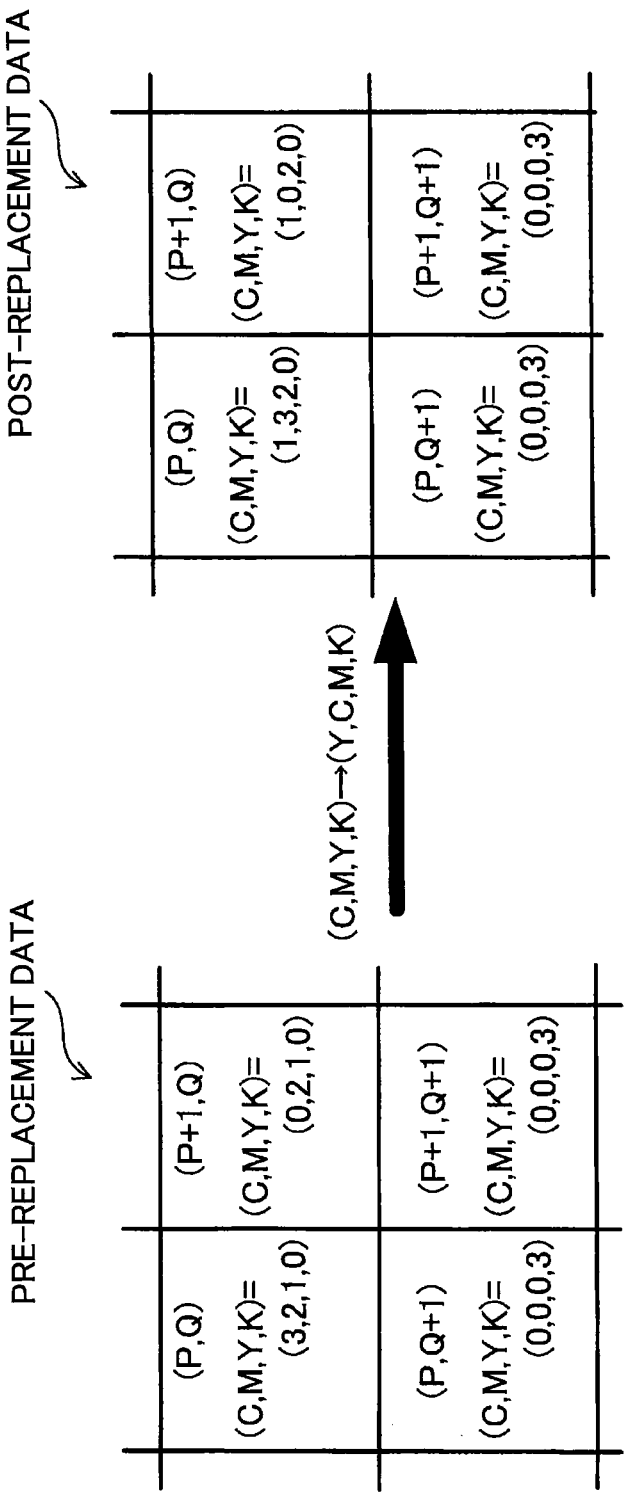
FIG. 4 is an explanatory diagram illustrating a color replacement when a smallest residual amount corresponds to color other than black.

For example, the residual amount of ink is decreased in the order of M, Y, K, and C, and the consumption amount of ink is decreased in the order of C, M, and Y, as shown in Table 1. In this case, the replacement process is performed so that component values of C, M, and Y in the pre-replacement data respectively match component values of M, Y, and C in the post-replacement data as illustrated in FIG. 4. As a result, in the pixel of coordinates (P, Q), the pixel value (C, M, K, Y) in the pre-replacement data=(3, 2, 1, 0) are changed to the pixel value (C, M, K, Y)=(1, 3, 2, 0). The pixel value is changed similarly in the coordinates (P+1, Q). The replacement process uses the consumption amounts of all the inks used in the graphic areas GR1 and GR2, and the text areas TX1 and TX2 which are targets for the replacement process. Further, the same replacement of the colors is executed in all the graphic areas GR1 and GR2, and the text areas TX1 and TX2. According to this configuration, when the target image includes the areas (or images) GR1, GR2, TX1, and TX2 which include target regions for the color replacement process, the color replacement can be properly achieved.

For example, the author of the target image TA usually changes or unifies the color of characters in an intended manner in the two text areas TX1 and TX2. According to the above-described configuration, by executing the same replacement process for the text areas TX1 and TX2, characters of the pixel value (C, M, Y)=(3, 2, 1) in the target image TA is converted to the pixel value (C, M, Y)=(1, 3, 2) both in the text areas TX1 and TX2 in the post-replacement data. Similarly, characters of the pixel value (C, M, Y)=(3, 2, 1) in the text area TX1 and characters of the pixel value (C, M, Y)=(2, 3, 1) in the text area TX2 are converted to the pixel value (C, M, Y)=(1, 3, 2) in the text area TX1 and converted to the pixel value (C, M, Y)=(1, 2, 3) in the text area TX2 in the post-replacement data, respectively. As a result, the author's intension with respect to change or uniformity of the color can be maintained. In a conceivable case where two different replacement processes are respectively applied to the text areas TX1 and TX2, characters of the pixel value (C, M, Y)=(3, 2, 1) in the text area TX1 and characters of the pixel value (C, M, Y)=(2, 3, 1) in the text area TX2 may be converted to the pixel value (C, M, Y)=(1, 3, 2) in the text areas TX1 and TX2 in the post-replacement data. In this case, the color replacement is made against the intention of the author. Such a situation can be avoided in the replacement process of the embodiment. Note that the same problem will be occurred in a conceivable case where two different replacement processes are respectively applied to the graphic areas GR1 and GR2. Further, the similar problem is caused in a conceivable case where one graphic area such as GR2 including a plurality of color areas to which the different color replacement processes are performed. For example, a color area of (C, M, Y)=(3, 2, 1) and a color area of (C, M, Y)=(2, 3, 1) are included in one graphic area GR2 are replaced according to the different color replacement processes. The embodiment also can avoid occurrence of these problems.

Further, as shown in FIG. 4, when the residual amount of K ink is not the smallest, component value K in the pre-replacement data is maintained as it is in the post-replacement data. That is, in the replacement process, the component value K is not replaced with values of other colors. In the above described configuration, characters in a print result, which is originally represented by the component value of K in the target image TA, can be prevented from being converted to color to be difficult to see through the replacement process.

Figure 5:
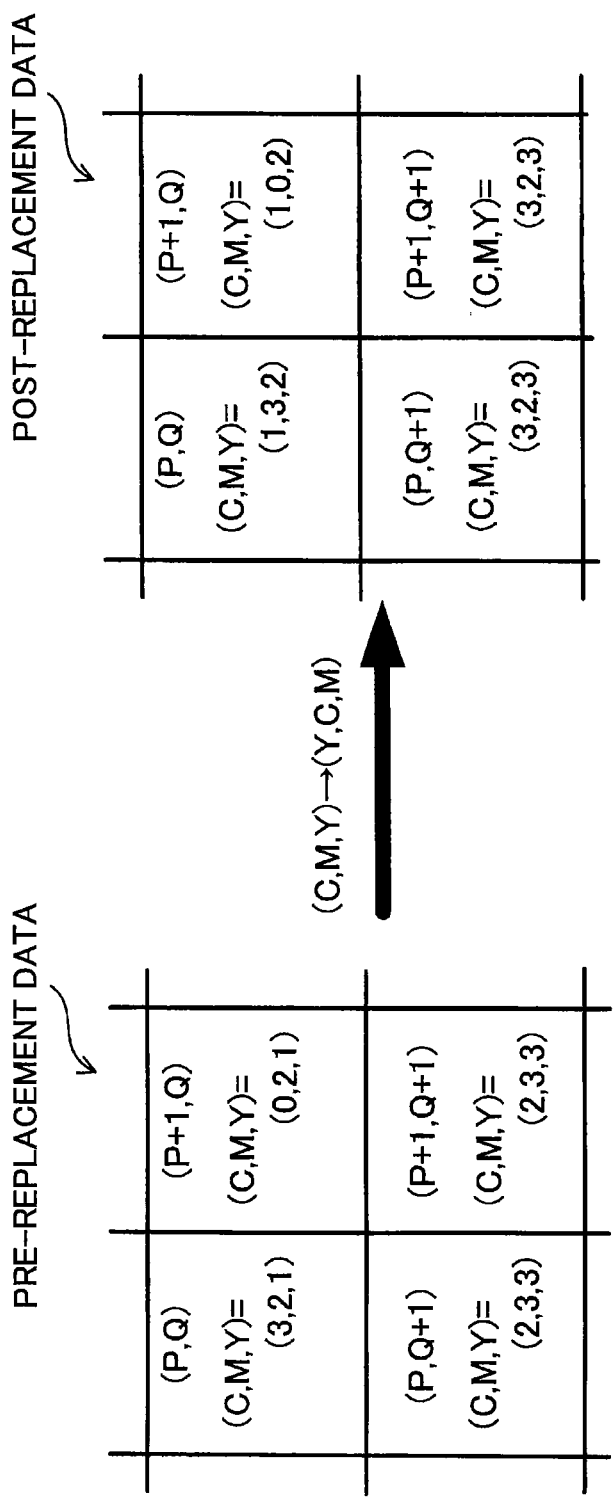
FIG. 5 is an explanatory diagram illustrating the color replacement when a smallest residual amount corresponds to black.

On the other hand, as shown in FIG. 5, when the residual amount of K ink is the smallest, the target image TA is represented by CMY without the component value K in the color conversion process. According to this configuration, when the residual amount of K ink is the smallest, the printing operation can be performed without using K ink. In addition, by representing the black color using component values CMY, the black color can be prevented from being represented by a significantly different color (e.g., yellow).

Further, in the replacement process, one value of pre-replacement component values C, M, and Y is replaced so that one post-replacement component of a different color has the one value. And, the post-replacement component of K has the pre-replacement component value of K.

In S26 or S28, when the difference in the consumption amount is not large among those of C, M, and Y colors (S26: YES or S28: YES), print data is generated without execution of the replacement process. According to this configuration, when the difference in the consumption amount is not large among C, M, and Y colors, coloring of the target image TA can be maintained.

In S24 to S28, when the smallest residual amount among those of C, M, Y, and K inks is greater than or equal to the first prescribed value, the difference in the consumption amount among C, M, and Y inks is compared to the first value whereas when the smallest residual amount is less than the first prescribed value, the difference in the consumption amount among C, M, and Y inks is compared to the second value smaller than the first value. According to this configuration, the difference in the consumption amount among C, M, and Y inks is compared to the second value when the residual amount of ink is small so as to actively execute the replacement process for preventing the ink from being used up. When the difference in the consumption amount among C, M, and Y inks is compared to the first value when the residual amount of ink is comparatively large so as to suppress execution of the replacement process, thereby maintaining coloring of the target image TA. The first and second values are settable by the manufacturer of the printer 50 in an appropriate manner. When the replacement process needs to be actively executed, the first and second values are set small. When the execution of the replacement process needs to be suppressed as much as possible, the first and second values are set large. That is, the smaller the first or second value is, the more frequently the replacement process is executed.

In S30, when the consumption amount of ink is comparatively small (S30: YES), the replacement process is not executed. According to this configuration, in a situation where the consumption amount among C, M, and Y inks is not significantly changed by the replacement process due to a small total consumption amount of ink, coloring of the target image TA can be maintained. The first threshold value is settable by the manufacturer of the printer 50 in an appropriate manner. When the replacement process needs to be actively executed, the first threshold value is set small. When the execution of the replacement process needs to be suppressed as much as possible, the first threshold value is set large. That is, the smaller the first threshold value is, the more frequently the replacement process is executed.

In S32, when the difference between the largest residual amount and the smallest residual amount is comparative low, the replacement process is not executed. According to this configuration, in a situation where the residual amount of ink is not significantly changed, coloring of the target image TA can be maintained. The reference value is settable by the manufacture of the printer 50 in an appropriate manner. When the replacement process needs to be actively executed, the reference value is set small. When the execution of the replacement process needs to be suppressed as much as possible, the reference value is set large. That is, the smaller the reference value is, the more frequently the replacement process is executed.

In the above replacement process, color replacement is not made in the photo area PI. According to this configuration, coloring of a printed photo can be maintained in the target image TA.

The same replacement process is executed for the target image TA including the plurality of page images P1 and P2. This configuration can prevent the different color replacements from being executed on different pages.

(Correspondences)

The PC 10 is an example of "print data generation apparatus". The graphic areas GR1 and GR2, and the text areas TX1 and TX2 are examples of "allowable image" and "consumption amount acquisition target image". The photo area PI is an example of "non-replacement image".

Second Embodiment

Figure 6:
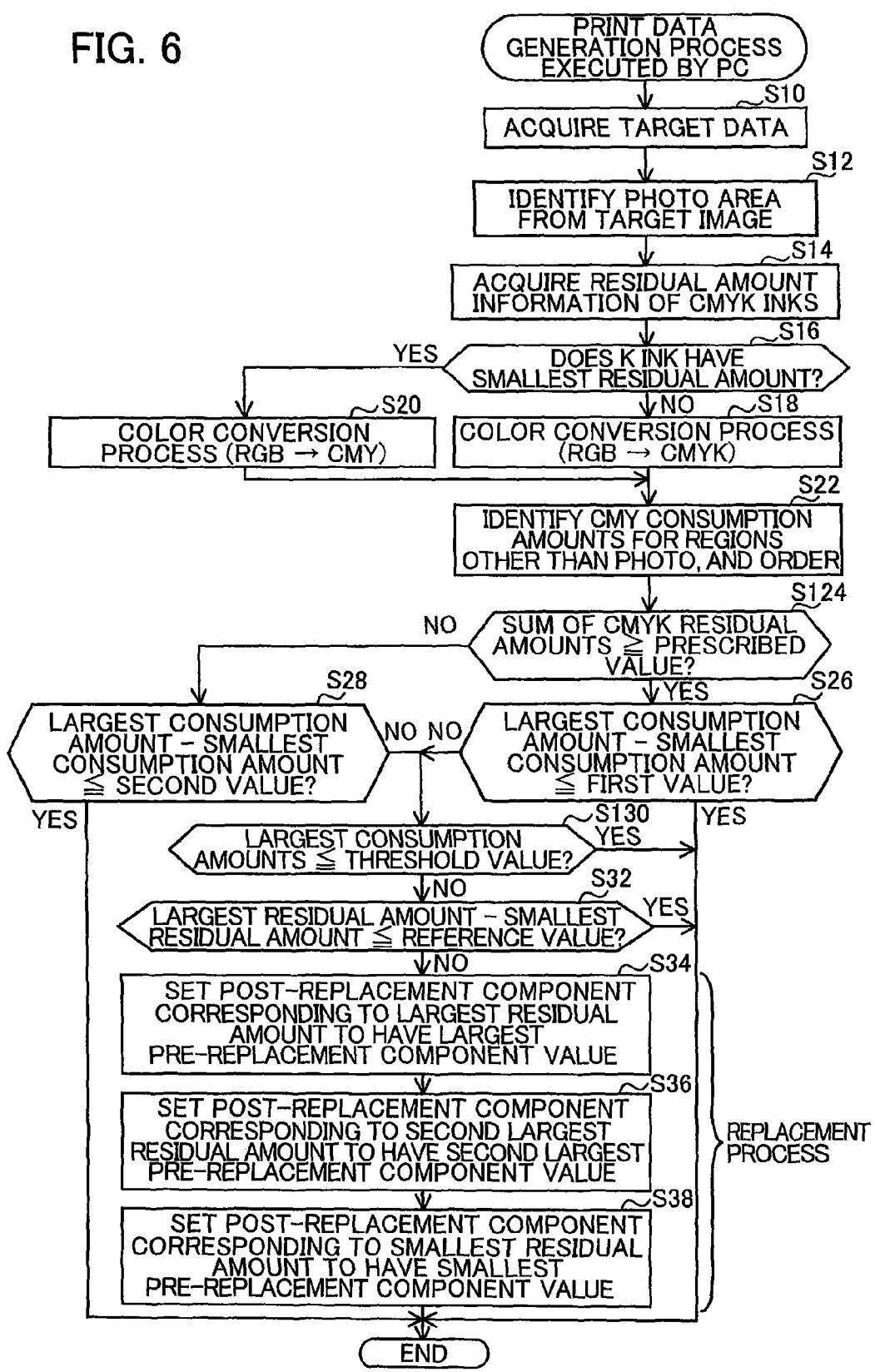
FIG. 6 is a flowchart illustrating a print data generation process according to a second embodiment.

In a print data generation process according to a second embodiment, the PC 10 executes S124 and S130 of FIG. 6 in place of S24 and S30 of the first embodiment (FIG. 2). That is, in S124, the CPU 32 determines whether the total sum of the residual amounts of C, M, Y, and K inks is greater than or equal to a second prescribed value (e.g., 20 ml). When the total sum of the residual amounts of C, M, Y, and K inks is greater than or equal to the second prescribed value (S124: YES), the CPU 32 advances to S26. When the total sum of the residual amounts of inks is less than the second prescribed value (S124: NO), the CPU 32 advances to S28. The second prescribed value is a value different from the first prescribed value. In S130, the CPU 32 determines whether the largest consumption amount among those of C, M, Y, and K inks is smaller than or equal to a second threshold value. When the largest consumption amount is smaller than or equal to the second threshold value (S130: YES), the CPU 32 ends the print data generation process. When the largest consumption amount is more than the second threshold value (S130: NO), the CPU 32 advances to S32.

While the disclosure has been described in detail with reference to the above embodiments, it would be apparent to those skilled in the art that various changes and modifications may be made thereto.

(1) In the above embodiments, the printer 50 is an inkjet printer. However, the printer 50 may be a laser printer provided with a plurality of colors of toner as colorant.

(2) In the above embodiments, the printer 50 executes printing using the four color types of ink (CMYK inks). However, the printer 50 may use two or three color types of ink, or five or more color types of ink. When five or more color inks are used, in S20 of FIG. 2 a pixel value K may be represented by pixel values of two or more colors excluding K.

(3) In the above embodiments, the PC 10 executes the print data generation process. However, the controller 70 of the printer 50 may execute the print data generation process. In this modification, the printer 50 is an example of "a print data generation apparatus". Alternatively, an external apparatus (e.g., server) other than the PC 10 and the printer 50 may execute the print data generation process. In this modification, the external apparatus is an example of "print data generation apparatus".

(4) In the above embodiments, the PC 10 executes the replacement process for the text areas TX1 and TX2, and the graphic areas GR1 and GR2. However, the PC 10 may execute the replacement process for only the text areas TX1 and TX2. In this modification, the text areas TX1 and TX2 are examples of "an allowable image", and the graphic areas GR1 and GR2, and the photo area PI are examples of "non-replacement image". Alternatively, the PC 10 may execute the replacement process for the text areas TX1 and TX2, the graphic areas GR1 and GR2, and the photo area PI. In this modification, the text areas TX1 and TX2, the graphic areas GR1 and GR2, and the photo area PI are examples of "an allowable image".

(5) In the above embodiments, in S22 the CPU 32 identifies the consumption amounts of C, M, and Y inks and the order thereof in the areas GR1, GR2, TX1, and TX2 other than the photo area PI. However, the CPU 32 may identify the consumption amounts of C, M, and Y inks and the order thereof in the areas GR1, GR2, TX1, TX2, and the photo area PI. In this modification, the graphic areas GR1 and GR2, and text areas TX1 and TX2 are examples of "an allowable image", and the areas GR1, GR2, TX1, TX, and PI are examples of "a consumption amount acquisition target image".

(6) In the above embodiments, in S22 the CPU 32 identifies the consumption amounts of inks and the order thereof. However, the CPU 32 may identify only one of the consumption amounts of inks and the order thereof. When the consumption amount is not identified, S26, S28, S30, and S130 in the print data generation process may be skipped.

(7) In the above embodiments, in S12 the CPU 32 acquires the residual amount of ink from the printer 50. However, the CPU 32 may acquire the order (first to fourth in the descending order of the residual amounts of inks) of the residual amount of ink.

(8) In the replacement processes according to the embodiments, in S34 the CPU 32 sets a component in the post-replacement data of a color corresponding to the largest residual amount among C, M, and Y colors so as to have a pre-replacement component value of a color corresponding to the largest consumption amount among C, M, and Y colors. In S36, the CPU 32 sets a component in the post-replacement data of a color corresponding to the second largest residual amount among C, M, and Y colors so as to have a pre-replacement component value of a color corresponding to the second largest consumption amount among C, M, and Y colors. In S38, the CPU 32 sets a component in the post-replacement data of a color corresponding to the smallest residual amount among C, M, and Y colors so as to have a pre-replacement component value of a color corresponding to the smallest consumption amount among C, M, and Y colors. However, in the replacement process, when one color (for example, C) is smaller in the residual amount than another color (for example, M) and larger in the consumption amount than the another color (M), the CPU 32 may exchanges the component values of the one color (C) and the another color (M) with each other. In this case, remaining color (Y) need not be replaced.

(9) In the above embodiments, the CPU 32 uses the consumption amounts of C, M, and Y inks and residual amounts of C, M, and Y inks to replace one of C, M, and Y component values with another. However, the CPU 32 may use the consumption amounts of C, M, Y, and K inks and residual amounts of C, M, Y, and K inks to replace one of C, M, Y, and K component values with another.

(10) In the above embodiments, when the residual amount of K ink is the smallest (S16: YES), the CPU 32 converts an image represented by RGB into an image represented by CMY (S20). However, even when the residual amount of K ink is the smallest, the CPU 32 converts an image represented by RGB into an image represented by CMYK. In this case, the printer 50 may execute a printing operation by using K ink.

(11) In the above embodiments, when the plurality of page images P1 and P2 representing a plurality of pages are included in the target image TA, the CPU 32 identifies the consumption amount of ink by using the areas GR1, GR2, TX1, and TX2 included in the page images P1 and P2 (S22) and executes the same replacement process on images in the pages P1 and P2 (S34 to S38). However, when the page images P1 and P2 representing pages are included in the target image TA, the CPU 32 may identify the consumption amounts of inks for each page image and execute the replacement process for each page. That is, the different replacement processes using respective different consumption amounts are performed on the respective pages.

(12) The CPU 32 may not execute the processes S24-S32 in the print data generation process of FIG. 2. That is, the CPU 32 may execute the replacement process S34-S38 directly after identifying the consumption amounts of inks and the order thereof in S22.

(13) In the above embodiments, the CPU 32 executes the printer driver 36 (i.e., software) to implement the processes of FIGS. 2 and 6. Alternatively, the processes of FIGS. 2 and 6 may be achieved at least partially by hardware such as a logic circuit.

The steps or processes in the first and second embodiments and the modifications may be arbitrary combined.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. A print data generation apparatus comprising:
a processor; and
a memory storing computer-readable instructions therein, the computer-readable instructions, when executed by the processor, causing the print data generation apparatus to perform:
acquiring target image data representing a target image which is a target for a printing operation in which a printer uses a plurality of types of colorant representing respectively a plurality of colors having a first color and a second color, the plurality of types of colorant having a first colorant representing the first color and a second colorant representing the second color, the target image including a plurality of pixels and including a first image including an allowable image which is a target for color replacement, the allowable image having a first-color region and a second-color region, consumption amounts of at least one type of colorant in the first-color region being different from consumption amounts of at least one type of colorant in the second-color region;

acquiring first information concerning a plurality of residual amounts respectively corresponding to the plurality of types of colorant, the plurality of residual amounts including a first residual amount of the first colorant and a second residual amount of the second colorant;
acquiring second information concerning a first consumption amount and a second consumption amount, the first consumption amount being an estimated amount of the first colorant to be consumed in a case where the entire first image is printed by the printer on a basis of pre-replacement data obtained from the target image data without performing color replacement, the second consumption amount being an estimated amount of the second colorant to be consumed in the case where the entire first image is printed by the printer on the basis of the pre-replacement data without performing the color replacement, the pre-replacement data representing the first image, the pre-replacement data including a plurality of pre-replacement pixel values respectively corresponding to pixels in the first image, each pre-replacement pixel value including a plurality of pre-replacement components respectively corresponding to the plurality of types of colorant, the plurality of pre-replacement components being respectively set to a plurality of pre-replacement component values, the plurality of pre-replacement component value including a first pre-replacement component value corresponding to the first colorant and a second pre-replacement component value corresponding to the second colorant; and
generating print data representing the entire target image by using the target image data, the print data being for the printer to print the target image with the plurality of types of colorant, the print data including post-replacement data representing the first image, the post-replacement data being obtained by the color replacement on the pre-replacement data, the post-replacement data including a plurality of post-replacement pixel values respectively corresponding to the pixels in the first image, each post-replacement pixel value including a plurality of post-replacement color components respectively corresponding to the plurality of types of colorant, the plurality of post-replacement components including a first post-replacement component corresponding to the first colorant and a second post-replacement component corresponding to the second colorant,
wherein in a case where the first residual amount is smaller than the second residual amount and the first consumption amount is larger than the second consumption amount, the color replacement on the pre-replacement data is performed so that in the allowable image, the second post-replacement component of a pixel is set to the first pre-replacement component value of the pixel and the first post-replacement component of the pixel is set to a pre-replacement component value other than the first pre-replacement component value of the pixel.

2. The print data generation apparatus according to claim 1, wherein the plurality of types of colorant has at least three types of colorant,
wherein the second information concerns a plurality of consumption amounts of respective ones of the plurality of types of colorant, each of the plurality of consumption amounts being an estimated consumption amount of a corresponding type of colorant in the case where the entire first image is printed by the printer on the basis of pre-replacement data without performing color replacement, the plurality of consumption amounts including the first consumption amount and the second consumption amount, wherein the first residual amount is a smallest residual amount among the plurality of residual amounts, wherein the second consumption amount is a smallest consumption amount among the plurality of consumption amounts.

3. The print data generation apparatus according to claim 1, wherein the plurality of types of colorant includes at least three types of colorant, wherein the plurality of post-replacement components has values which are obtained by replacing the plurality of pre-replacement component values so that a first color order matches a second color order, the first color order being an order of the colors corresponding to an ascending order of a plurality of consumption amounts to be consumed in a case where the entire first image is printed by the printer on the basis of the values of the plurality of post-replacement components, the second color order being an order of the colors corresponding to an ascending order of the plurality of residual amounts.

4. The print data generation apparatus according to claim 1, wherein the plurality of types of colorant includes a black colorant representing black and a plurality of non-black types of colorant representing colors other than black, wherein the plurality of pre-replacement components includes a pre-replacement black component corresponding to the black colorant and a plurality of non-black components respectively corresponding to the plurality of non-black types of colorant, wherein the plurality of post-replacement components includes a post-replacement black component corresponding to the black colorant and a plurality of post-replacement non-black components respectively corresponding to the plurality of non-black types of colorant, wherein the plurality of post-replacement non-black components has values which are obtained by replacing values of the plurality of pre-replacement non-black components so that a value of one pre-replacement non-black component corresponding to one color is replaced to a value of one post-replacement non-black component corresponding to a color different from the one color.

5. The print data generation apparatus according to claim 4, wherein the plurality of types of colorant includes at least three types of colorant, wherein the plurality of residual amounts further includes a black residual amount of the black colorant, wherein in a case where the black residual amount is a smallest amount among the plurality of residual amounts, at least one value of the plurality of non-black post-replacement components represents color which is represented by a pre-replacement component value corresponding to black.

6. The print data generation apparatus according to claim 1, wherein the target image includes a second image in which pixel values are not target for the color replacement, wherein the second image includes a photo region in which a photo image is arranged, wherein the print data further includes non-replaced data representing the second image, the non-replaced data being obtained on a basis of a part of the plurality of pre-replacement pixel values in the second image without performing the color replacement.

7. The print data generation apparatus according to claim 1, wherein the target image includes a plurality of page images respectively representing a plurality of pages, wherein in a case where the first image includes a plurality of allowable images located respectively to the plurality of pages, the first consumption amount is the estimated amount of the first colorant to be consumed in the case where the entire first image including the plurality of allowable images is printed by the printer on the basis of the pre-replacement data without performing color replacement, and the second consumption amount is the estimated amount of the second colorant to be consumed in the case where the entire first image including the plurality of allowable images is printed by the printer on the basis of the pre-replacement data without performing color replacement.

8. The print data generation apparatus according to claim 1, wherein the second information concerns a plurality of consumption amounts of respective ones of the plurality of types of colorant, each of the plurality of consumption amounts being an estimated consumption amount of a corresponding type of colorant in the case where the entire first image is printed by the printer on the basis of pre-replacement data without performing color replacement, the plurality of consumption amounts including the first consumption amount and the second consumption amount, wherein in a case where a difference between a largest consumption amount and a smallest consumption amount among all of the plurality of consumption amounts corresponding to colors which are target for the preplacement is smaller than or equal to a reference value, the print data is generated without performing the color replacement.

9. The print data generation apparatus according to claim 8, wherein in a case where a first condition is met, the reference value is set to a first value, the first condition is one of a condition that a sum of the plurality of residual amounts is larger than or equal to a first specific value and a condition that a smallest residual amount among the plurality of residual amounts is larger than or equal to a second specific value, wherein the first condition is not met, the reference value is set to a second value smaller than the first value.

10. The print data generation apparatus according to claim 1, wherein the second information concerns a plurality of consumption amounts of respective ones of the plurality of types of colorant, each of the plurality of consumption amounts being an estimated consumption amount of a corresponding type of colorant in the case where the entire first image is printed by the printer on the basis of pre-replacement data without performing color replacement, the plurality of consumption amounts including the first consumption amount and the second consumption amount, wherein in a case where a second condition is met, the print data is generated without performing the color replacement, wherein the second condition is one of a condition that a sum of all the plurality of consumption amounts corresponding to colors which are target for the preplacement is smaller than or equal to a first threshold value and a condition that a largest consumption amount among the plurality of consumption amounts corresponding to the colors which are target for the replacement is smaller than or equal to a second threshold value.

11. The print data generation apparatus according to claim 1, wherein in a case where a difference between a largest residual amount and a smallest residual amount among the plurality of residual amounts is smaller than or equal to a reference value, the print data is generated without performing the color replacement.

12. A non-transitory computer readable storage medium storing a set of program instructions installed on and executed by a computer, the set of program instructions comprising:
   acquiring target image data representing a target image which is a target for a printing operation in which a printer uses a plurality of types of colorant representing respectively a plurality of colors having a first color and a second color, the plurality of types of colorant having a first colorant representing the first color and a second colorant representing the second color, the target image including a plurality of pixels and including a first image including an allowable image which is a target for color replacement, the allowable image having a first-color region and a second-color region, consumption amounts of at least one type of colorant in the first-color region being different from consumption amounts of at least one type of colorant in the second-color region;
   acquiring first information concerning a plurality of residual amounts respectively corresponding to the plurality of types of colorant, the plurality of residual amounts including a first residual amount of the first colorant and a second residual amount of the second colorant;
   acquiring second information concerning a first consumption amount and a second consumption amount, the first consumption amount being an estimated amount of the first colorant to be consumed in a case where the entire first image is printed by the printer on a basis of pre-replacement data obtained from the target image data without performing color replacement, the second consumption amount being an estimated amount of the second colorant to be consumed in the case where the entire first image is printed by the printer on the basis of the pre-replacement data without performing the color replacement, the pre-replacement data representing the first image, the pre-replacement data including a plurality of pre-replacement pixel values respectively corresponding to pixels in the first image, each pre-replacement pixel value including a plurality of pre-replacement components respectively corresponding to the plurality of types of colorant, the plurality of pre-replacement components being respectively set to a plurality of pre-replacement component values, the plurality of pre-replacement component value including a first pre-replacement component value corresponding to the first colorant and a second pre-replacement component value corresponding to the second colorant; and
   generating print data representing the entire target image by using the target image data, the print data being for the printer to print the target image with the plurality of types of colorant, the print data including post-replacement data representing the first image, the post-replacement data being obtained by the color replacement on the pre-replacement data, the post-replacement data including a plurality of post-replacement pixel values respectively corresponding to the pixels in the first image, each post-replacement pixel value including a plurality of post-replacement color components respectively corresponding to the plurality of types of colorant, the plurality of post-replacement components including a first post-replacement component corresponding to the first colorant and a second post-replacement component corresponding to the second colorant,
   wherein in a case where the first residual amount is smaller than the second residual amount and the first consumption amount is larger than the second consumption amount, the color replacement on the pre-replacement data is performed so that in the allowable image, the second post-replacement component of a pixel is set to the first pre-replacement component value of the pixel and the first post-replacement component of the pixel is set to a pre-replacement component value other than the first pre-replacement component value of the pixel.

13. A print data generation apparatus comprising:
   first acquiring means for acquiring target image data representing a target image which is a target for a printing operation in which a printer uses a plurality of types of colorant representing respectively a plurality of colors having a first color and a second color, the plurality of types of colorant having a first colorant representing the first color and a second colorant representing the second color, the target image including a plurality of pixels and including a first image including an allowable image which is a target for color replacement, the allowable image having a first-color region and a second-color region, consumption amounts of at least one type of colorant in the first-color region being different from consumption amounts of at least one type of colorant in the second-color region;
   second acquiring means for acquiring first information concerning a plurality of residual amounts respectively corresponding to the plurality of types of colorant, the plurality of residual amounts including a first residual amount of the first colorant and a second residual amount of the second colorant;
   third acquiring means for acquiring second information concerning a first consumption amount and a second consumption amount, the first consumption amount being an estimated amount of the first colorant to be consumed in a case where the entire first image is printed by the printer on a basis of pre-replacement data obtained from the target image data without performing color replacement, the second consumption amount being an estimated amount of the second colorant to be consumed in the case where the entire first image is printed by the printer on the basis of the pre-replacement data without performing the color replacement, the pre-replacement data representing the first image, the pre-replacement data including a plurality of pre-replacement pixel values respectively corresponding to pixels in the first image, each pre-replacement pixel value including a plurality of pre-replacement components respectively corresponding to the plurality of types of colorant, the plurality of pre-replacement components being respectively set to a plurality of pre-replacement component values, the plurality of pre-replacement component value including a first pre-replacement component value corresponding to the first colorant and a second pre-replacement component value corresponding to the second colorant; and generating means for generating print data representing the entire target image by using the target image data, the print data being for the printer to print the target image with the plurality of types of colorant, the print data including post-replacement data representing the first image, the post-replacement data being obtained by the color replacement on the pre-replacement data, the post-replacement data including a plurality of post-replacement pixel values respectively corresponding to the pixels in the first image, each post-replacement pixel value including a plurality of post-replacement color components respectively corresponding to the plurality of types of colorant, the plurality of post-replacement components including a first post-replacement component corresponding to the first colorant and a second post-replacement component corresponding to the second colorant, wherein in a case where the first residual amount is smaller than the second residual amount and the first consumption amount is larger than the second consumption amount, the color replacement on the pre-replacement data is performed so that in the allowable image, the second post-replacement component of a pixel is set to the first pre-replacement component value of the pixel and the first post-replacement component of the pixel is set to a pre-replacement component value other than the first pre-replacement component value of the pixel.

* * * * *